United States Patent [19]

Peterson

[11] 4,152,632
[45] May 1, 1979

[54] D.C. MOTOR SPEED CONTROL APPARATUS HAVING BOTH ARMATURE CURRENT RATE CONTROL AND ZERO CURRENT DEADTIME OPTIMIZED

[75] Inventor: Robert S. Peterson, Williamsville, N.Y.

[73] Assignee: Westinghouse Electric Corp., Pittsburgh, Pa.

[21] Appl. No.: 815,334

[22] Filed: Jul. 13, 1977

[51] Int. Cl.² ............................................. H02P 5/00
[52] U.S. Cl. ..................................... 318/317; 318/332
[58] Field of Search ............... 318/317, 332, 434, 315, 318/326, 327, 616, 617

[56] References Cited

U.S. PATENT DOCUMENTS

| | | | |
|---|---|---|---|
| 3,284,688 | 11/1966 | Black | 318/332 |
| 3,378,743 | 4/1968 | Weiser | 318/434 |
| 3,629,633 | 12/1971 | O'Callaghan | 318/317 |
| 3,983,464 | 9/1976 | Peterson | 318/327 |

Primary Examiner—Gene Z. Rubinson
Assistant Examiner—M. K. Mutter
Attorney, Agent, or Firm—James J. Wood

[57] ABSTRACT

A speed control system is disclosed for a direct current motor drive energized by a thyristor armature supply. Voltage regulation for the thyristor supply is through a parallel current controller in which an armature current controller is arranged in parallel with positive and negative rate current controllers, the output of this parallel combination being applied as a voltage control signal to the thyristor supply through a parallel switch which mandates priority of control. Normally, the current controller will determine the thyristor armature supply voltage, but if the armature current rate exceeds a preset current rate reference, the parallel switch intercedes and the appropriate rate current controller takes over control of the thyristor supply voltage. When the thyristor armature supply current rate goes below the rate reference setting, the armature current controller will again resume control of the thyristor supply voltage.

5 Claims, 11 Drawing Figures

PRIOR ART

CURRENT CONTROLLER TRANSFER FUNCTION

$$\frac{-V_b^*}{-i_a} = \frac{(1+T_1 S)(1+T_2 S)}{T_5 T_4 S^2 (1+T_3 S)}$$

CURRENT RATE CONTROLLER TRANSFER FUNCTION

$$\frac{-V_b^*}{-i_a} = K \frac{1}{(1+T_6 S)(1+T_7 S)}$$

$T_1$ = 28m SEC. (COMPENSATION FOR ARMATURE TIME CONSTANT)

$T_2$ = .103 SEC. (COMPENSATION FOR CONTROLLER INTEGRATOR)

$T_3$ = 1m SEC. (COMPENSATION FOR NOISE FILTER)

$T_4$ = $2.5 \times 10^{-4}$ TO .112 (INTEGRATING TIME CONSTANT)

$T_5$ = .09 SEC. (INTEGRATING TIME CONSTANT)

$T_6$ = 1.7m SEC. (COMPENSATION FOR NOISE FILTER)

$T_7$ = .2m SEC. (COMPENSATION FOR NOISE FILTER)

K = .0435 TO 19.2 STATIC GAIN; VOLTS/VOLT

S = LAPLACE OPERATOR; 1/SEC.

FIG. 4.

PRIOR ART

| % STEP CURRENT | (−) TO (+) STEP CURRENT ZERO CURRENT DEADTIME−(MILLISECONDS) | | | | | | | | | | | | | | |
|---|---|---|---|---|---|---|---|---|---|---|---|---|---|---|---|
| | ½ | 1 | 2 | 3 | 4 | 5 | 10 | 20 | 30 | 40 | 50 | 60 | 70 | 80 | 90 | 100 |
| SYSTEM FIG.1. | 16 | 16 | 12 | 12 | 12 | 12 | 8 | 6 | 6 | 6 | 6 | 6 | 6 | 6 | 6 | 6 |
| SYSTEM FIG.5. | 40 | 24 | 24 | 24 | 16 | 16 | 16 | 8 | 8 | 8 | 8 | 8 | 8 | 8 | 8 | 8 |

| % STEP CURRENT | (+) TO (−) STEP CURRENT ZERO CURRENT DEADTIME−(MILLISECONDS) | | | | | | | | | | | | | | |
|---|---|---|---|---|---|---|---|---|---|---|---|---|---|---|---|
| | ½ | 1 | 2 | 3 | 4 | 5 | 10 | 20 | 30 | 40 | 50 | 60 | 70 | 80 | 90 | 100 |
| SYSTEM FIG.1. | 16 | 16 | 12 | 12 | 12 | 12 | 8 | 6 | 6 | 6 | 6 | 6 | 6 | 6 | 6 | 6 |
| SYSTEM FIG.5. | 56 | 32 | 28 | 24 | 24 | 16 | 16 | 8 | 8 | 8 | 8 | 8 | 8 | 8 | 8 | 8 |

D.C. MOTOR SPEED CONTROL APPARATUS HAVING BOTH ARMATURE CURRENT RATE CONTROL AND ZERO CURRENT DEADTIME OPTIMIZED

BACKGROUND OF THE INVENTION

1. Field of the Invention

This invention relates to a speed control system for a d.c. motor energized by a thyristor armature supply.

2. Description of the Prior Art

In a d.c. motor drives which are energized by a thyristor armature supply, there is a high armature current rate change when the thyristor supply goes through zero current in connection with a current reversal. The high armature current rate change adversely affects the d.c. motor with concomitant increase in maintenance costs. At times this high current rate change has even resulted in drive speed regulator oscillations. As a result of these considerations, the current controller of the speed control system had to be an operational amplifier having proportional integrator (PI) characteristics rather than one having proportional integrator squared $(PI)^2$ characteristics such as described in U.S. Pat. No. 3,983,464 for "Direct Current Motor Speed Control Apparatus" invented by Robert S. Peterson.

SUMMARY OF THE INVENTION

A speed control apparatus is provided for a d.c. motor energized by a thyristor armature supply. The thyristor voltage is controlled by a parallel combination of a current controller and positive and negative rate current controllers operating through a parallel switch which mandates control priority. When the armature current rate exceeds a preset current rate reference, a rate controller intercedes and controls the thyristor armature supply voltage until the thyristor armature supply current setting again goes below the rate reference setting.

This arrangement enables a more efficient current controller to be utilized, provides a smaller zero current deadtime during thyristor supply current reversals, and insures that the armature current rate is always limited to a preset maximum rate.

BRIEF DESCRIPTION OF THE DRAWINGS

FIG. 6 (a)(b)(c)(d)(e) are current and voltage waveforms typical of the operation of the prior art system of FIG. 5;

FIG. 7 (a)(b)(c)(d)(e) are current and voltage waveforms illustrating the operating characteristics of the system of FIG. 1 in accordance with the invention;

DESCRIPTION OF A PREFERRED EMBODIMENT

Figure 1:
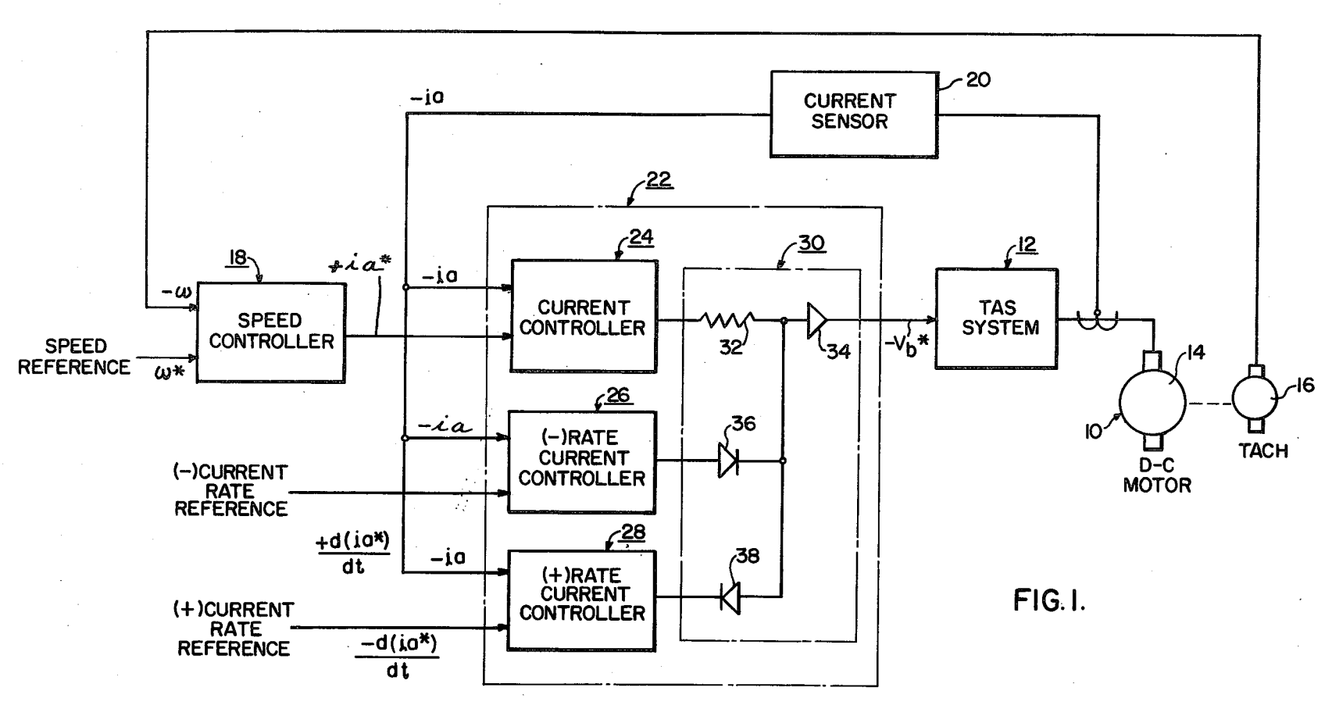
FIG. 1 is a block diagram of the d.c. motor speed control system in accordance with the invention.

Referring now to FIG. 1, there is shown a d.c. motor indicated generally at 10. A thyristor armature supply system, indicated generally at 12 energizes the armature 14 of the motor 10. A tachometer generator 16, coupled for rotation with the armature provides a speed signal $-\omega$, which is applied to a speed controller indicated generally at 18, the latter also receives a speed reference signal $\omega^*$. A current sensor indicated symbolically at 20 derives an armature current signal $-ia$.

A parallel current controller indicated generally at 22 comprises (a) current controller 24, (b)(−) rate current controller 26, (c)(+) rate current controller 28, and (d) a parallel switch indicated generally at 30. The main components of the parallel switch 30 comprise a resistor 32, a non-inverting emitter follower 34, and diodes 36 and 38 poled as shown.

The speed controller 18 continuously monitors the speed of the motor 10 and sends a reference armature current signal $+ia^*$ to the current controller 24. As indicated on the drawing, the current controller also receives the signal $-ia$ from the current sensor 20.

Figure 2:
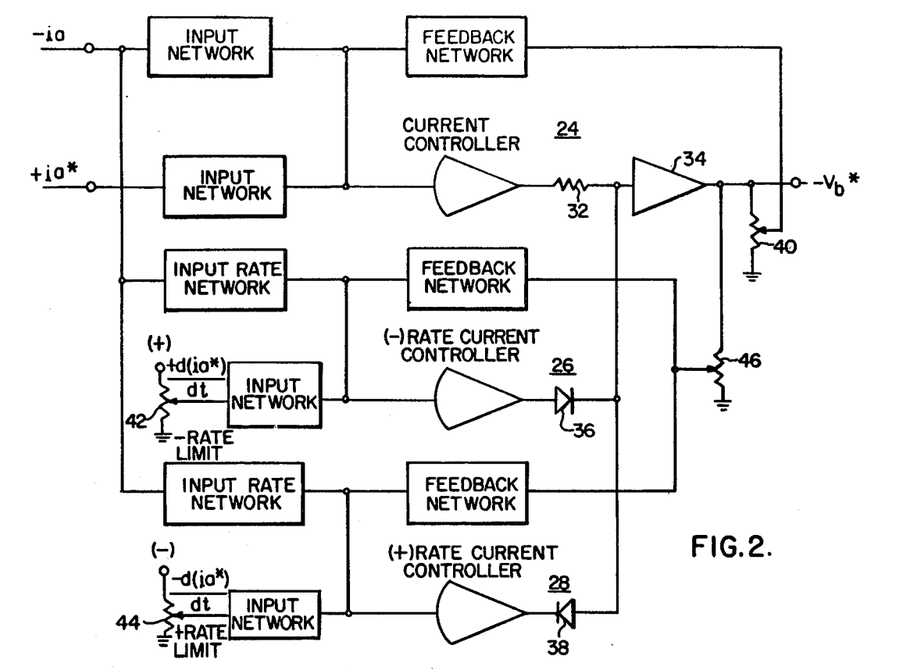
FIG. 2 is a block diagram of the d.c. motor speed control system of the invention in greater detail.

The rate controllers 26, 28 also receive the signal $-ia$ from the current sensor 20, and additionally they receive the current rate reference signals $$\frac{+d(ia^*)}{dt} \text{ and } \frac{-d(ia^*)}{dt}$$

respectively. The current rate reference signals are potentimeter settings which will be explained presently in connection with the description of FIG. 2.

The parallel switch 30 determines the order of priority between the current controller and one of the rate controllers, i.e. (−) rate current controller 26 or (+) rate current controller 28, and delivers a voltage control signal $-V_b^*$ to the TAS system 12.

Figure 3:
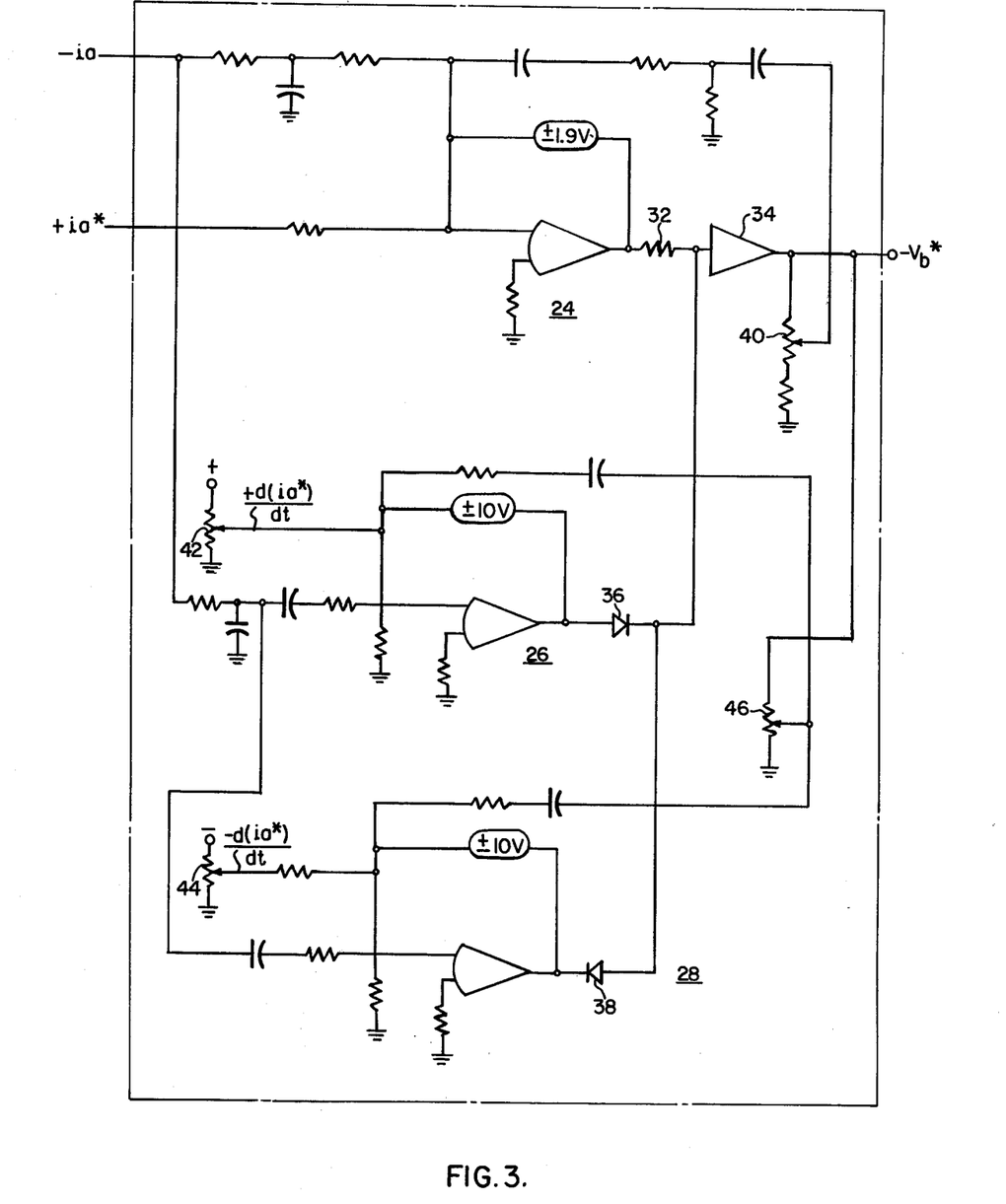
FIG. 3 is an electrical schematic showing the armature current controller and the rate current controllers used in the invention.

A simplified diagram of the parallel current and rate controllers of the invention is shown in FIG. 2, and a more detailed electrical schematic is shown in FIG. 3. The current controller 24 is an operational amplifier having proportional integrator squared $(PI)^2$ characteristics. Such a current controller is disclosed in U.S. Pat. No. 3,983,464 for "Direct Current Motor Speed Control Apparatus" the invention of Robert S. Peterson, and assigned to the same assignee as the instant invention. The dynamic adjustments for the current controller 24 are by means of the gain potentiometer 40.

The dynamic adjustments for the negative rate current controller 26 and the positive rate current controller 28 are by means of the rate limit adjustment potentiometers 42 and 44 respectively and the commonly shared rate control gain potentiometer 46.

Figure 4:
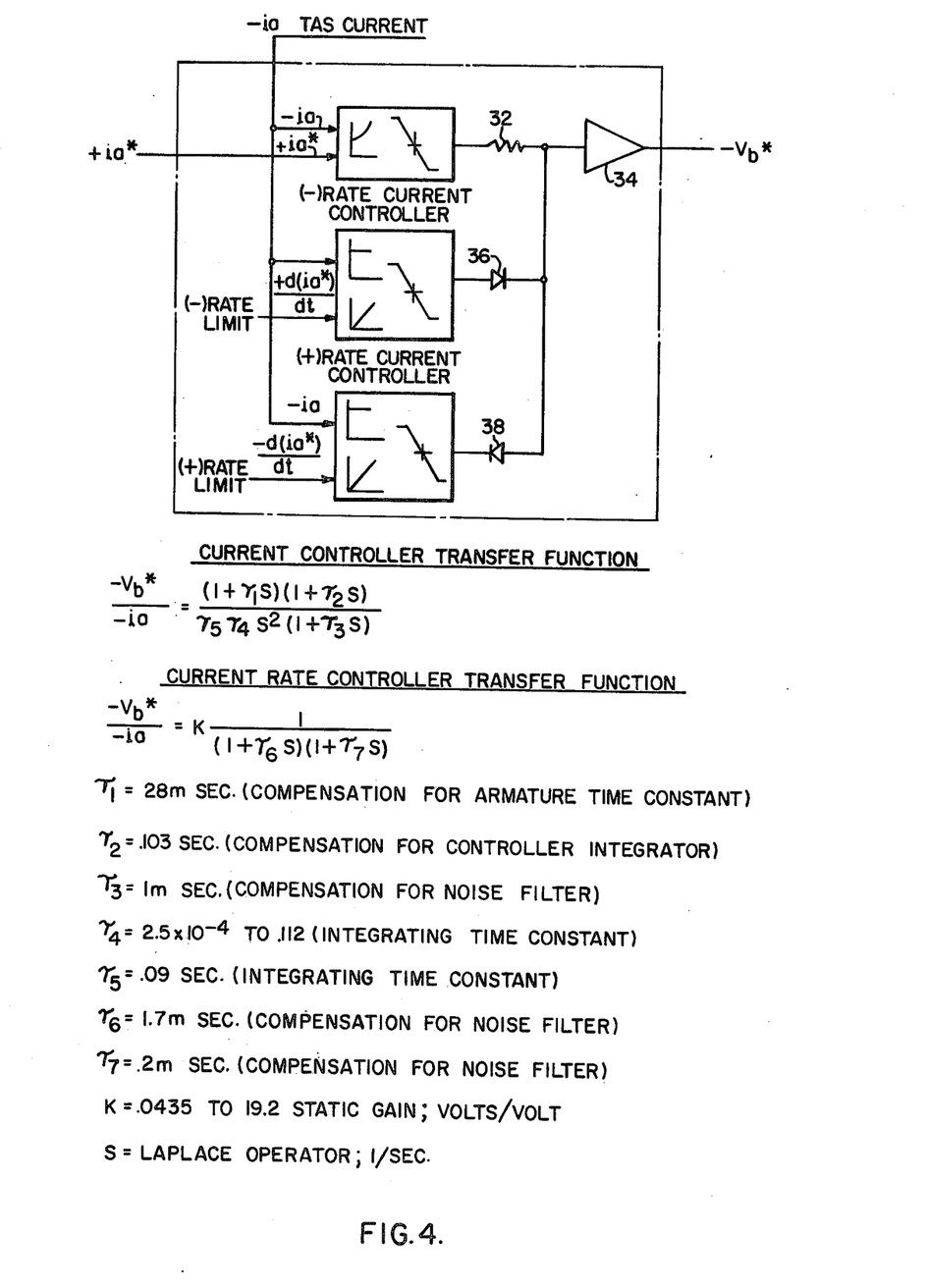
FIG. 4 is a simplified diagram showing the transfer functions of the armature current and rate current controllers of FIG. 3.
Figure 11:
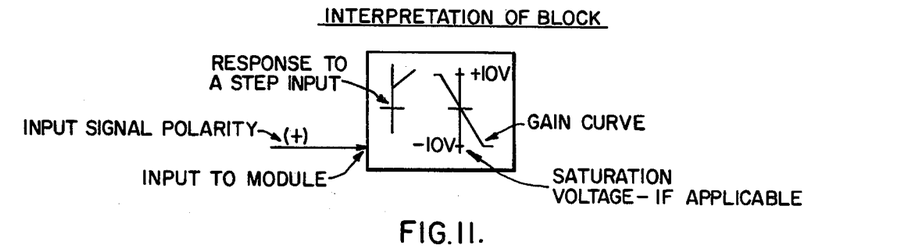
FIG. 11 is a diagram depicting the meaning of the symbols used for the function blocks shown in FIG. 4.

The transfer functions for the current controller 24, and the rate controllers 26, 28 are shown in FIG. 4. The interpretation of the symbols for the current controller and the current controller boxes is given in FIG. 11.

The operation of the FIG. 1 embodiment is as follows. Normally the current controller 24 will be controlling the armature current. However, the rate controllers 26,28 have first priority, and they take over when the armature current rate exceeds the preset current rate reference. This is accomplished by the resistor-diode network provided in the parallel switching means 30. First, it should be noted that the way in which the diodes 36,38 are arranged, when one rate controller is conducting, the diode associated with the other rate controller is back biased so that it is impossible for the (+) rate current controller and the (−) rate current controller to be operating at the same time.

A hypothetical example will serve to illustrate these concepts. Suppose that the current controller 24 is delivering an output which makes the input to the emitter follower 34, −4v, and the (+) rate current controller 28 is delivering a maximum or saturation voltage +10v. Under these conditions, the diode 38 is back biased i.e. its cathode is +10v and its anode is at −4v. Suppose now that the rate of change of −ia becomes greater than the reference $$\frac{-d(i_a*)}{dt}.$$

The voltage of the controller 28 will start to come down from +10v, and when it becomes less than −4v, diode 38 will be forward biased and it will conduct. The current controller 24 will now go to a voltage in the opposite direction i.e. saturation at +10v and about 14 volts will be dropped across resistor 32.

Figure 5:
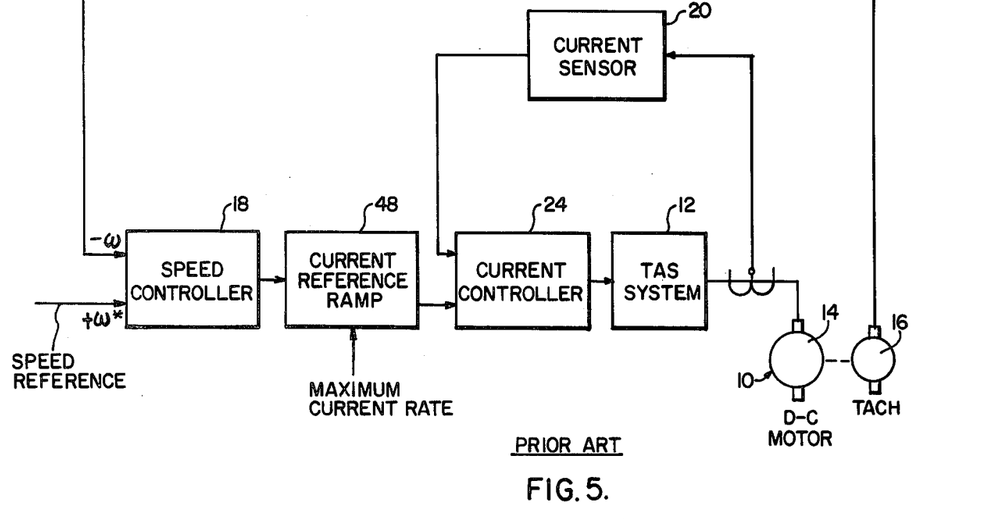
FIG. 5 is a prior art d.c. motor speed control system.

The prior art d.c. motor drive system shown in FIG. 5, utilizes a current reference ramp function generator 48 to control the maximum armature current rate by sending its output reference signal to the armature current controller 24. The disadvantages of this system reside in the fact that when a current reversal is being commanded, the thyristor armature supply system goes through zero current with a high armature current rate change. This increase in armature current rate above the current reference ramp setting is caused by speed controller wind up i.e. the speed controller continues to charge an integrating capacitor in the feedback path of its operational amplifier but there is no additional control function. Thus there is no control of the armature current rate when the armature current goes through zero amperes.

The zero current deadtime results from the fact that the thyristor armature supply 12 takes a finite time to switch thyristor conduction from the forward thryristors to the reverse thyristors, and conversely. The current controller 24 must force the inner voltage controller output voltage of the thyristor armature supply system 12 to move through a voltage deadband before a switch from forward thyristor conduction to reverse thyristor conduction (or conversely) is permitted.

The capability of the current controller 24 to force the inner voltage controller of the thyristor armature supply system 12 through the voltage deadband can reduce the zero current deadtime.

As a result of the high di/dt after the system of FIG. 5 goes through zero current, there is excessive sparking of the motor commutator resulting in higher maintenance costs. Indeed, if this action is repeated often enough it will require early replacement of the d.c. motor. The high increase in di/dt can also cause oscillation in the speed regulator, especially where there is a relatively small diameter shaft connected to a high inertial load-severe mechanical oscillations occur because of the suddenly applied torque to the system.

Figure 6:
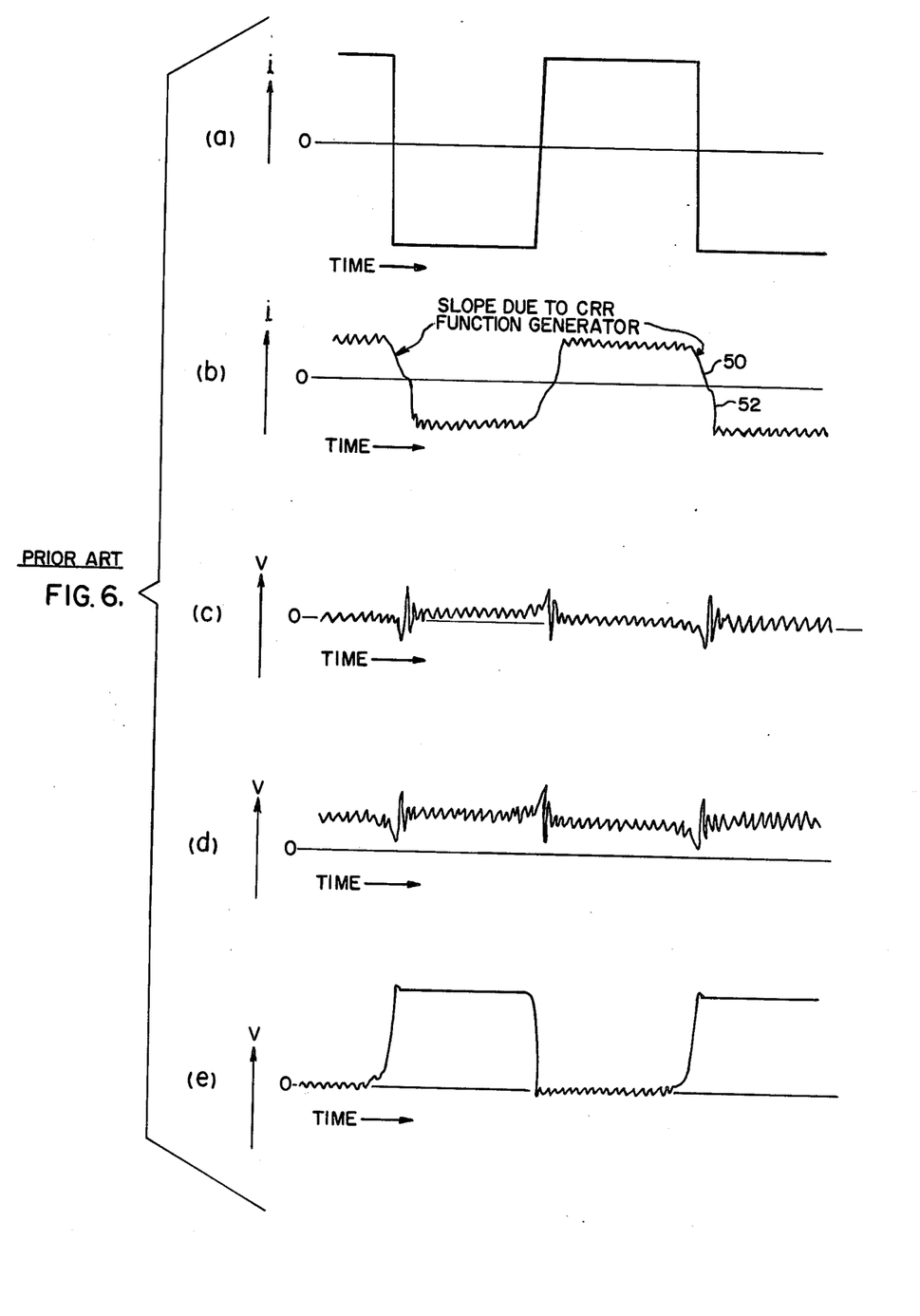

In FIG. 6 (a)(b)(c)(d)(e) there are depictions for response of the speed control system of FIG. 5 under stalled motor conditions. In FIG. 6(a) there is shown the step current reference signal applied through the current reference ramp generator 48. FIG. 6(b) shows the armature current vs time. In particular attention is called to the slope of the current indentified at 50,52. This sudden jump in current is caused by the wind up of the speed controller when the thyristor armature supply 12 is passing through zero current. The slope is due to the presence of the current reference ramp generator 48. The armature current change is from rated current to rated current. In FIG. 6(c) there is depicted the voltage output for the current controller 24. FIG. 6(d) is the actual thyristor voltage. FIG. 6(e) is the voltage output of the inner voltage control loop within the TAS system 12.

Figure 7:
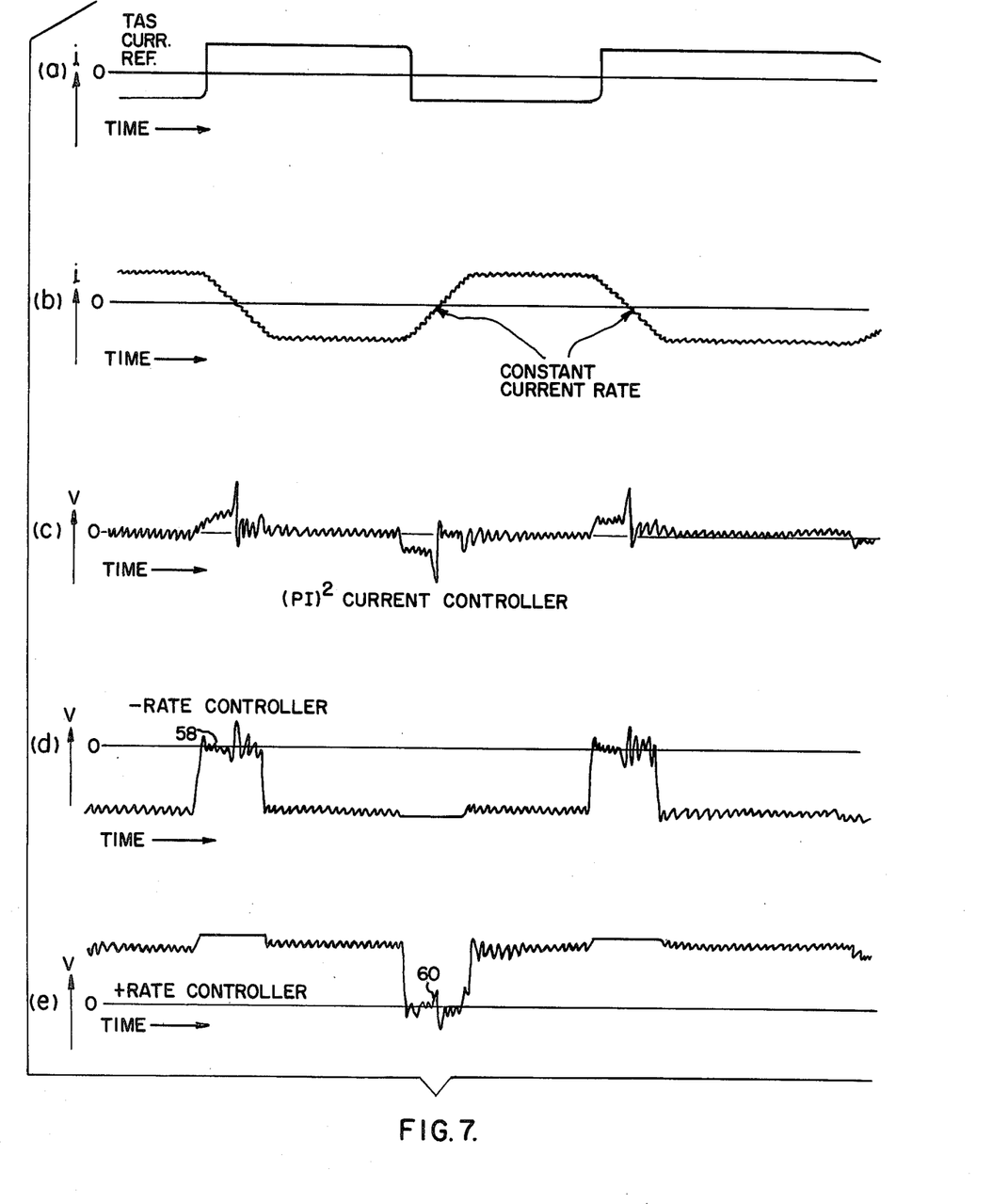

In FIGS. 7(a)(b)(c)(d)(e) there are depictions for the performance of the FIG. 1 parallel current controller in accordance with the instant invention (under stalled motor conditions). In FIG. 7(a) the disturbance is a step input to the current controller 24. FIG. 7(b) depicts the change in armature current from rated current to rated current. Attention is called to the constant current rate change identified at 54,56. An examination of FIG. 7(b) vis-à-vis FIG. 6(b) will reveal that the deadband is somewhat smaller albeit it still does exist. FIG. 7(c) shows the voltage out of the current controller 24. In FIGS. 7(d) and (e) there is shown the voltage vs time curves for the (−) rate current controller 26 and the (+) rate current controller 28 respectively. As indicated at 58,60 these controllers have taken over from the current controller 24 when the armature current is going through zero.

Figure 8:
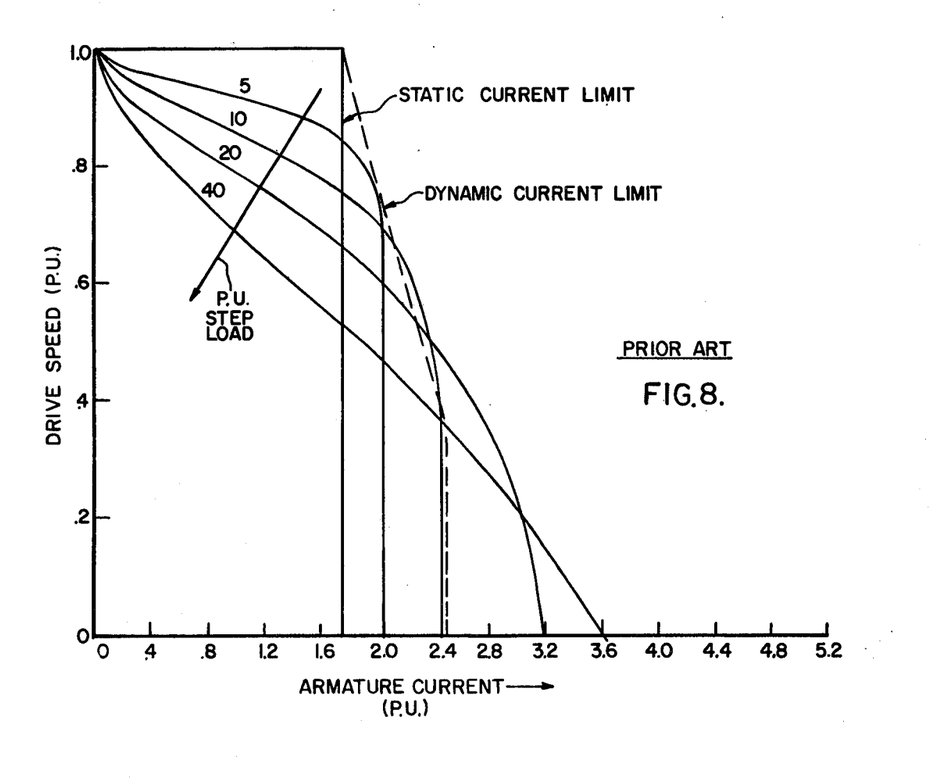
FIG. 8 is the stall load, current limit overshoot characteristic obtained by computer simulation for the FIG. 5 embodiment.
Figure 9:
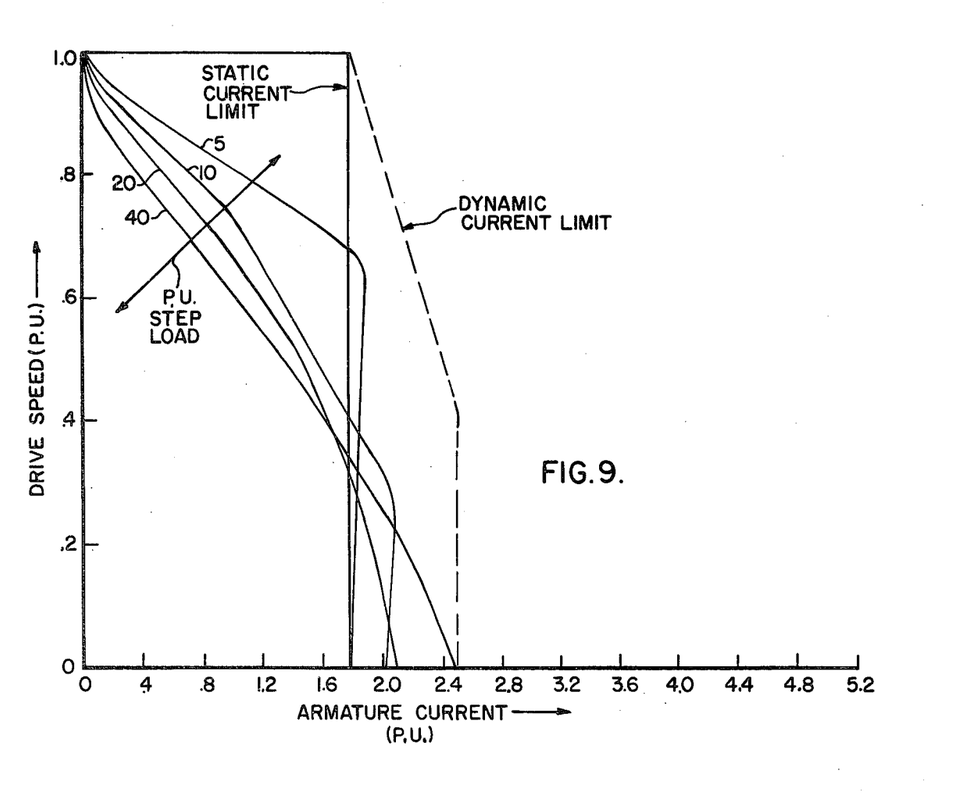
FIG. 9 is the stall load, current limit overshoot characteristics obtained by computer simulation for the FIG. 1 embodiment.

In FIGS. 8 and 9 there is shown the stall load current-limit overshoot responses of the systems of FIG. 5 (prior art) and FIG. 1 for comparison. These curves were prepared by computer simulation. P.U. is rated speed or rated armature current. Thus on the ordinate scale 0.2 is 20% rated speed and 0.4 is 40% rated armature current. The prior art system FIG. 8 overshoots the static current limit as well as the dynamic current limit. There is less overshooting of the FIG. 1 system. The dynamic current limit can be exceeded occasionally, but it causes severe sparking at the commutator. Obviously if it is done often enough it will ruin the motor.

Figure 10:
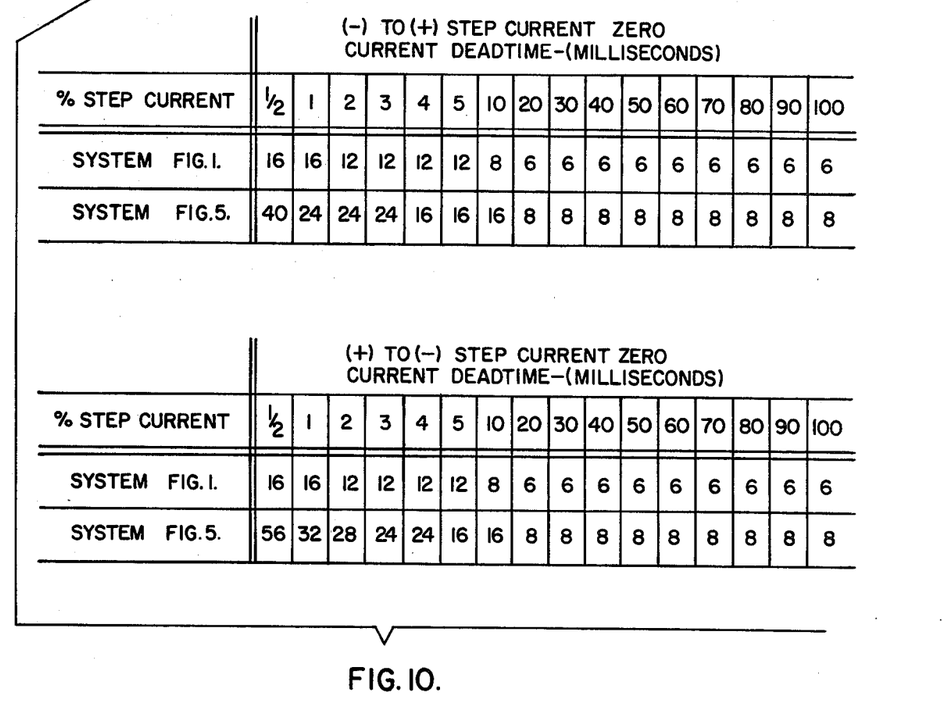
FIG. 10 depicts charts comparing zero current deadtime for − to + and + to − step current references for the embodiments of FIG. 1 and FIG. 5 respectively.

FIG. 10 shows charts comparing the zero current deadtime for − to + and + to − step current references for the system of FIG. 1 and FIG. 5 (prior art).

The advantages of the instant invention over the prior art system are as follows:
1. Current rate is always limited to a preset maximum rate.
2. Zero current deadtime is considerably smaller when the thyristor armature supply is going through zero amperes.
3. Thyristor armature supply stall load, current−limit overshoot is smaller.
4. The current loop has improved damping, thus permitting a faster current regulating feedback loop. This means that the bus voltage regulator operating on a motor field can be faster when the motor is operating in the field weakening range.

5. The improved damping of the current loop will probably mean reduced mechanical oscillations on drive systems such as the pouring reels of a bar mill which have torsional vibration characteristics.

What is claimed is:

1. A system for regulating the speed of a d.c. motor drive, said d.c. motor having an armature energized by a thyristor supply comprising:
    (a) an armature current controller;
    (b) a negative rate current controller;
    (c) a positive rate current controller;
    said armature current controller and said rate controllers having respective inputs connected in parallel to receive an instantaneous armature current signal $-ia$, said armature current controller having another input to receive an armature current reference signal $ia^*$, said rate current controllers having additional inputs to receive negative and positive current rate reference signals; and
    (d) switching means connected to the outputs of said armature current and rate current controllers, said switching means having an output $-Vb+$ which is connected to said thyristor armature supply, said switching means determining the priority of control between said armature current controller and one of said rate current controllers, and insuring that the rate current controllers determine the output signal $-Vb+$ in proximity to zero armature current.

2. A system according to claim 1 wherein said armature current controller is an operational amplifier having proportioned integrator squared $(PI)^2$ characteristics.

3. A system for regulating the speed of a d.c. motor drive said d.c. motor having an armature energized by a thyristor armature comprising:
    (a) a speed controller connected to receive an instantaneous motor speed signal $-\omega$ and a speed reference signal $\omega^*$, and to deliver an armature current reference signal $ia^*$;
    (b) an armature current controller;
    (c) a negative rate current controller;
    (d) a positive rate current controller;
    said armature current controller, and said rate current controllers having respective inputs connected in parallel to receive an instantaneous armature current signal $-ia$, said armature current controller having another input to receive said current reference signal $ia^*$, said negative and positive rate current controllers having additional inputs to receive negative and positive current rate reference signals respectively,
    (e) parallel switching means connected to the respective outputs of said armature current controller and said rate current controllers, and having an output connected to said thyristor armature supply to deliver a voltage control signal $-Vb^*$ for controlling the thyristor voltage, said parallel switching means mandating priority of operating control to said rate controllers in proximity to zero armature current.

4. A system according to claim 3 wherein said armature current controller is an operational amplifier having proportional integrator squared $(PI)^2$ characteristics.

5. A system according to claim 3 wherein said parallel switching means comprises a resistor connected to the output of said armature current controller and a pair of diodes connected to the outputs of said rate current controllers, said diodes being poled so that when one is conducting the other is thereby back biased.

* * * * *